United States Patent
Lu et al.

(10) Patent No.: US 10,891,031 B2
(45) Date of Patent: Jan. 12, 2021

(54) METHOD AND DEVICE FOR DISPLAYING TASK MANAGEMENT INTERFACE

(71) Applicant: BEIJING XIAOMI MOBILE SOFTWARE CO., LTD., Beijing (CN)

(72) Inventors: Zhenzhou Lu, Beijing (CN); Jiayan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 26 days.

(21) Appl. No.: 16/211,464

(22) Filed: Dec. 6, 2018

(65) Prior Publication Data
US 2019/0179503 A1    Jun. 13, 2019

(30) Foreign Application Priority Data
Dec. 13, 2017    (CN) .......................... 2017 1 1325197

(51) Int. Cl.
| | | |
|---|---|---|
| G06F 3/0484 | (2013.01) | |
| G06F 3/0481 | (2013.01) | |
| G06F 9/48 | (2006.01) | |
| G06F 3/0488 | (2013.01) | |
| G06F 9/451 | (2018.01) | |

(52) U.S. Cl.
CPC .......... *G06F 3/0484* (2013.01); *G06F 3/0481* (2013.01); *G06F 3/0488* (2013.01); *G06F 9/451* (2018.02); *G06F 9/4843* (2013.01)

(58) Field of Classification Search
CPC .............................. G06F 3/0488; G06F 3/0482
See application file for complete search history.

(56) References Cited

U.S. PATENT DOCUMENTS

| | | | | |
|---|---|---|---|---|
| 2011/0087989 | A1* | 4/2011 | McCann | G06F 3/04817 715/772 |
| 2013/0174179 | A1* | 7/2013 | Park | G06F 3/0483 718/107 |
| 2013/0321340 | A1* | 12/2013 | Seo | H04M 1/0214 345/174 |

(Continued)

FOREIGN PATENT DOCUMENTS

| | | |
|---|---|---|
| CN | 105893136 A | 8/2016 |
| CN | 106020796 A | 10/2016 |

(Continued)

OTHER PUBLICATIONS

European search report of EP application No. 18212029.5 dated Apr. 18, 2019.

(Continued)

*Primary Examiner* — Rayeez R Chowdhury
(74) *Attorney, Agent, or Firm* — Syncoda LLC; Feng Ma

(57) ABSTRACT

A method applied in a mobile terminal for displaying a task management interface includes: receiving a first trigger signal configured to trigger display of the task management interface; acquiring n application programs running in the mobile terminal triggered by the first trigger signal, where n is an integer greater than 1; acquiring a preview interface corresponding to each application program; and displaying the task management interface including preview interfaces respectively corresponding to the n application programs and arranged in a lattice.

19 Claims, 7 Drawing Sheets

(56) References Cited

U.S. PATENT DOCUMENTS

2014/0173517 A1* 6/2014 Chaudhri ............ G06F 3/04883
　　　　　　　　　　　　　　　　　　715/830
2017/0329505 A1　 11/2017 Sap
2018/0164980 A1* 6/2018 Huang .................. G06F 3/0482

FOREIGN PATENT DOCUMENTS

| CN | 106537319 A | 3/2017 |
| CN | 107203305 A | 9/2017 |
| EP | 3242204 A1 | 11/2017 |

OTHER PUBLICATIONS

First office action of Chinese application No. 201711325197.6 dated Sep. 21, 2020.

* cited by examiner

METHOD AND DEVICE FOR DISPLAYING TASK MANAGEMENT INTERFACE

CROSS-REFERENCE TO RELATED APPLICATIONS

The present application claims priority to Chinese Patent Application No.: 201711325197.6 filed on Dec. 13, 2017, the entire contents of which are incorporated herein by reference.

BACKGROUND

When a user uses a mobile terminal, such as a mobile phone or a tablet computer, a task management interface may be invoked, which includes application programs running in the mobile terminal.

The mobile terminal can display preview interfaces respectively corresponding to application programs in a layered manner in the task management interface. The layered manners may include a longitudinal layered manner and a lateral layered manner. Taking the longitudinal layered manner as an example, the mobile terminal displays the preview interface corresponding to an application program in the task management interface, and displays a partial preview interface corresponding to another application program at above or below the preview interface.

SUMMARY

The present disclosure relates to the field of mobile terminal technology, and more specifically to a method and a device for displaying a task management interface.

According to a first aspect of embodiments of the present disclosure, there is provided a method for displaying a task management interface the method is applied in a mobile terminal, and includes: receiving a first trigger signal for triggering display of the task management interface; acquiring n application programs running in the mobile terminal triggered by the first trigger signal, where n is an integer greater than 1; acquiring a preview interface corresponding to each application program; and displaying the task management interface, the task management interface including preview interfaces respectively corresponding to the n application programs which are arranged in a lattice.

In some embodiments, the acquiring the preview interface corresponding to the application program includes: scaling down a current display interface of the application program from a first size to a second size, to generate the preview interface corresponding to the application program.

In some embodiments, the acquiring the preview interface corresponding to the application program includes: clipping a display area of a third size from the current display interface of the application program; and scaling down the display area of the third size to a fourth size, to generate the preview interface corresponding to the application program; or, scaling down the current display interface of the application program from the first size to the second size; and clipping a display area of a fourth size from the scaled-down current display interface of the application program, to generate the preview interface corresponding to the application program.

In some embodiments, the method further includes: determining display positions of the preview interfaces respectively corresponding to the n application programs in the task management interface according to last running moments respectively corresponding to the n application programs in the foreground; or, determining display positions of the preview interfaces respectively corresponding to the n application programs in the task management interface according to frequency of usage respectively corresponding to the n application programs; or, determining display positions of the preview interfaces respectively corresponding to the n application programs in the task management interface according to correlation among the n application programs.

In some embodiments, the task management interface further includes a preferred preview interface arranged at the frontmost of the task management interface; wherein the preferred preview interface is a preview interface corresponding to the application program running in the foreground; or, the preferred preview interface is a preview interface corresponding to a music application program; or, the preferred preview interface displays system function options.

In some embodiments, the method further includes: receiving a signal of a drag operation a start position of which is positioned in a preview interface corresponding to a first application program in the task management interface and an end position of which is positioned in a preview interface corresponding to a second application program in the task management interface; and switching the first application program and the second application program to run in the foreground triggered by the signal of the drag operation, display interfaces of the first and second application programs are displayed in a split-screen.

In some embodiments, a delete operation control is further displayed at an upper layer of the task management interface; the method further comprising: receiving a second trigger signal corresponding to the delete operation control; and stopping running the n application programs triggered by the second trigger signal.

In some embodiments, the method further includes: displaying an application program list when a signal of a first sliding operation in a preset area in the task management interface is received, the application program list including application programs installed in the mobile terminal; and/or, displaying a system function interface when a signal of a second sliding operation in a preset area in the task management interface is received, the system function interface including a system function option.

According to a second aspect of embodiments of the present disclosure, there is provided a device for displaying a task management interface, wherein the device is applied in a mobile terminal, and includes: a signal receiving module configured to receive a first trigger signal for triggering display of the task management interface; a program acquiring module configured to acquire n application programs running in the mobile terminal triggered by the first trigger signal, where n is an integer greater than 1; an interface acquiring module configured to a preview interface corresponding to each application program; and an interface displaying module configured to display the task management interface, the task management interface including preview interfaces respectively corresponding to the n application programs which are arranged in a lattice.

In some embodiments, the interface acquiring module is configured to scale down a current display interface of the application program from a first size to a second size, to generate the preview interface corresponding to the application program.

In some embodiments, the interface acquiring module is configured to: clip a display area of a third size from the current display interface of the application program; and scale down the display area of the third size to a fourth size, to generate the preview interface corresponding to the application program, or, scale down the current display interface of the application program from the first size to the second size; and clip a display area of a fourth size from the scaled-down current display interface of the application program, to generate the preview interface corresponding to the application program.

In some embodiments, the device further includes: a position determining module configured to: determine display positions of the preview interfaces respectively corresponding to the n application programs in the task management interface according to last running moments respectively corresponding to the n application programs in the foreground; or, determine display positions of the preview interfaces respectively corresponding to the n application programs in the task management interface according to frequency of usage respectively corresponding to the n application programs; or, determine display positions of the preview interfaces respectively corresponding to the n application programs in the task management interface according to correlation among the n application programs.

In some embodiments, the task management interface further includes a preferred preview interface arranged at the frontmost of the task management interface, wherein the preferred preview interface is a preview interface corresponding to the application program running in the foreground; or, the preferred preview interface is a preview interface corresponding to a music application program; or, the preferred preview interface displays a system function option.

In some embodiments, the device further includes: a switching module; the signal receiving module is configured to receive a signal of a drag operation a start position of which is positioned in a preview interface corresponding to a first application program in the task management interface and an end position of which is positioned in a preview interface corresponding to a second application program in the task management interface; and the switching module is configured to switch the first application program and the second application program to run in the foreground triggered by the signal of the drag operation, display interfaces of the first and second application programs are displayed in a split-screen.

In some embodiments, a delete operation control is further displayed at an upper layer of the task management interface; the device further includes: a stop running module; the signal receiving module is configured to receive a second trigger signal corresponding to the delete operation control; the stop running module is configured to stop running the n application programs triggered by the second trigger signal.

In some embodiments, the device further includes: the interface displaying module is configured to display an application program list when a signal of a first sliding operation in a preset area in the task management interface is received, the application program list including application programs installed in the mobile terminal; and/or, display a system function interface when a signal of a second sliding operation in a preset area in the task management interface is received, the system function interface including system function options.

According to a third aspect of embodiments of the present disclosure, there is provided a device for displaying a task management interface, wherein the device is applied in a mobile terminal, and includes: a processor; and a memory for storing instructions executable by the processor; wherein the processor is configured to: receive a first trigger signal for triggering display of the task management interface; acquiring n application programs running in the mobile terminal triggered by the first trigger signal, where n is an integer greater than 1; acquiring a preview interface corresponding to each application program; and displaying the task management interface, the task management interface including preview interfaces respectively corresponding to the n application programs which are arranged in a lattice.

According to a fourth aspect of embodiments of the present disclosure, there is provided a computer-readable storage medium having stored therein programs for performing a method for displaying a task management interface, wherein the method is applied in a mobile terminal, and includes: receiving a first trigger signal for triggering display of the task management interface; acquiring n application programs running in the mobile terminal triggered by the first trigger signal, where n is an integer greater than 1; acquiring a preview interface corresponding to each application program; and displaying the task management interface, the task management interface including preview interfaces respectively corresponding to the n application programs which are arranged in a lattice.

It is to be understood that both the foregoing general description and the following detailed description are exemplary and explanatory only and are not restrictive of the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The inventors of the present disclosure have recognized that, in an existing technology, there is only one fully displayed preview interface corresponding to an application program in the task management interface, and the user can merely view and manage the application program corresponding to the above-mentioned fully displayed preview interface. If the user wants to view and manage other running application programs, he/she needs to perform a sliding operation in the task management interface, the process of which is inefficient and inconvenient.

Various embodiments of the present disclosure provide a method for displaying a task management interface, and a device based thereupon. In some embodiments of the present disclosure, the preview interfaces corresponding to a plurality of running application programs are arranged in a lattice in the task management interface. The respective preview interfaces do not overlap with each other, such that the user may view the preview interfaces corresponding to a plurality of application programs simultaneously. In addition, no other operations are required when the user manages the application programs corresponding to preview interfaces displayed in the task management interface, thereby improving the operation efficiency and convenience.

In a method according to some embodiments of the present disclosure, various steps may be executed by a mobile terminal, such as a mobile phone, a tablet computer, an e-book reader, a multimedia player, a Personal Digital Assistant (PDA), a wearable device, etc.

Figure 1A:
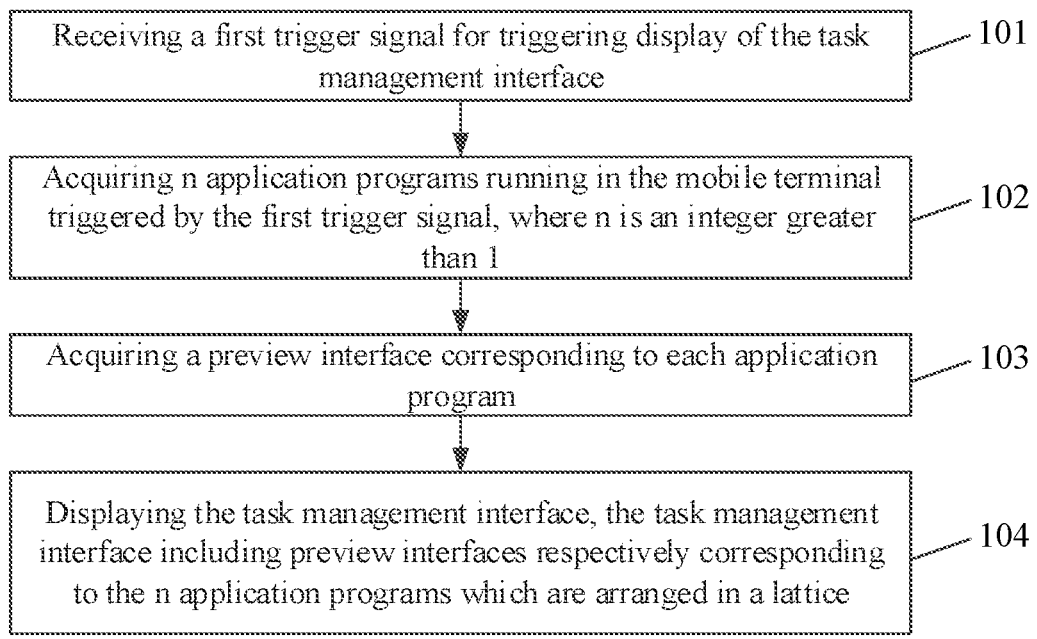
FIG. 1A is a flow chart of a method for displaying a task management interface according to some embodiments of the present disclosure.

FIG. 1A is a flow chart illustrating a method for displaying a task management interface, according to some embodiments of the present disclosure. The method is applied in the mobile terminal, and includes the following steps.

In step 101, a first trigger signal for triggering display of the task management interface is received.

The task management interface is a display interface of a task manager, and generally displays a preview interface corresponding to the running application program in the mobile terminal, such that the user may view and manage the running application program in the mobile terminal. The first trigger signal, which is generally triggered by a user, is used for triggering the mobile terminal to display the task management interface.

In some implementations, the first trigger signal is a signal of a sliding operation with a sliding speed less than a preset speed. When the user performs a sliding operation in the current display interface in the mobile terminal, if the mobile terminal detects that the speed corresponding to the sliding operation triggered by the user is less than the preset speed, the mobile terminal receives the first trigger signal for triggering the display of the task management interface. The speed corresponding to the sliding operation is the ratio of the trace length of the sliding operation to the action time of the sliding operation. The preset speed may be set based on actual needs, which is not limited in the embodiments of the present disclosure. In an example, the preset speed is 2 centimeters per second (cm/s).

In some other implementations, the first trigger signal is a signal of a sliding operation which stays longer than a preset time at the end position. When the user performs a sliding operation in the current display interface in the mobile terminal, if the mobile terminal detects that the sliding operation triggered by the user stays longer than the preset time at the end position, the mobile terminal receives the first trigger signal for triggering the display of the task management interface. The preset time may be set based on actual needs, which is not limited in the embodiments of the present disclosure. In an example, the preset time is 2 seconds.

It should be noted that the above first trigger signal is exemplary and explanatory only, and may be preset based on actual needs, which is not limited in the embodiments of the present disclosure.

In step 102, n application program running in the mobile terminal are acquired triggered by the first trigger signal, where n is an integer greater than 1.

A running application program includes an application program running in a foreground and an application program running in a background. The application program running in the foreground of the mobile terminal refers to the application program displays a user interface directly in the current display interface of the mobile terminal. The application program running in the background of the mobile terminal refers to the application program does not display a user interface in the current display interface of the mobile terminal and is still in a running state.

In step 103, the preview interface corresponding to each application program is acquired.

The preview interface corresponding to the application program may be a preview of the current display interface in the application program, and may also be a preset preview associated with the application program.

When the preview interface corresponding to the application program is the preview of the current display interface of the application program, acquiring the preview interface corresponding to the application program may include the following possible implementations.

In a first possible implementation, the current display interface of the application program is scaled down from a first size to a second size, to generate the preview interface corresponding to the application program.

The first size is the size of the current display interface of the application program, which may either be the size equal to the size of the screen of the mobile terminal, or the size slightly smaller than the size of the screen of the mobile terminal. The second size is the size of the preview interface corresponding to the application program. The second size is smaller than the first size. In some embodiments, after obtaining the current display interface of the application program, the mobile terminal needs to scale down the above current display interface in equal proportion (including scaling down the whole current display interface and the respective elements, e.g. icons, included in the current display interface in equal proportion), to obtain the current display interface of a second size, namely the preview interface corresponding to the application program.

In a second possible implementation, a display area of a third size is clipped from the current display interface of the application program. The display area of the third size is scaled down to a fourth size, to generate the preview interface corresponding to the application program.

Different from the first possible implementation, in the second possible implementation, the preview interface corresponding the application program is acquired based upon a partial interface of the current display interface of the application program. Here, the third size is the size of the partial interface of the current display interface of the application program. In some embodiments, the third size is half of the first size. The fourth size is the size of the preview interface corresponding to the application program. In some embodiments, the fourth size is half of the second size. In this implementation, the mobile terminal first clips the current display interface of the application program to obtain a partial interface of the current display interface of the application program, then scales down the partial interface of the current display interface of the application program in equal proportion, to obtain the preview interface corresponding to the application program.

In a third possible implementation, the current display interface of the application program is scaled down from the first size to the second size. The display area of the fourth size is clipped from the scaled current display interface of the application program, to generate the preview interface corresponding to the application program.

Different from the first possible implementation, in the third possible implementation, the preview interface corresponding to the application program is acquired based upon a partial interface of the current display interface of the application program. In this implementation, the mobile terminal first scales down the current display interface of the application program in equal proportion, to obtain a scaled current display interface, and then clips the scaled-down current display interface, to obtain the preview interface corresponding to the application program. Here, the second size is the size of the scaled current display interface, and the fourth size is the size of the preview interface corresponding to the application program. The fourth size is smaller than the second size.

When the preview interface corresponding to the application program is the preset preview of an interface associated with the application program, a preset correspondence relation between the application program and the preview interface is stored in the mobile terminal. After acquiring the running application program, the mobile terminal looks up the above preset correspondence relation, to obtain the preview interface corresponding to the application program.

In step 104, the task management interface including the preview interfaces respectively corresponding to the n application programs which are arranged in a lattice is received.

The preview interfaces respectively corresponding to the n application programs do not overlap with each other in the task management interface. In addition, the task management interface further includes identifications of the above n application programs, such as icons and names of the application program.

Figure 1B:
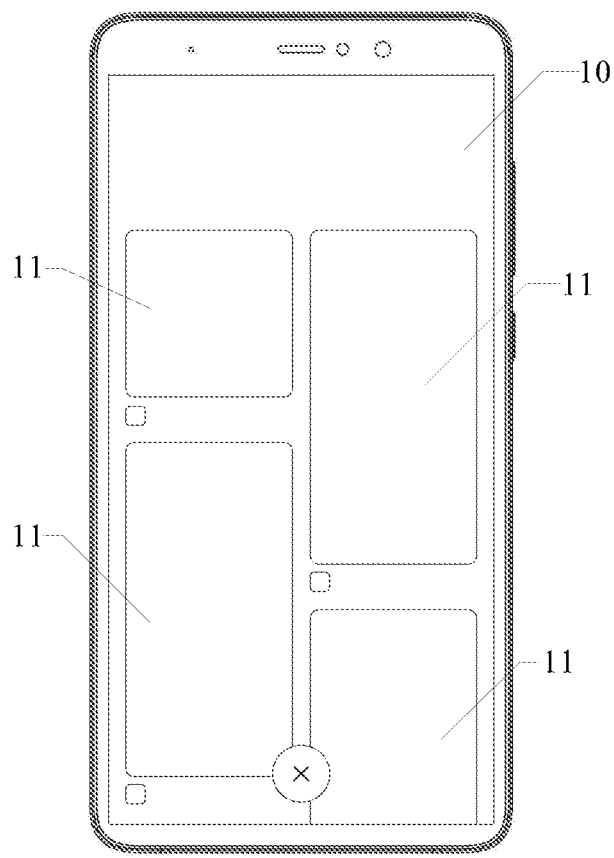
FIG. 1B is a schematic diagram illustrating a task management interface according to some embodiments of the present disclosure.

In some embodiments, the task management interface is divided into m columns, and the preview interfaces corresponding to the application programs are sequentially arranged in each column, where m is an integer greater than 1, and m is 2 in some embodiments. The above arrangement manner may be termed a longitudinal waterfall arrangement. In combination with FIG. 1B, it shows a schematic diagram of a task management interface 10 in some embodiments. The task management interface 10 includes a preview interface 11 respectively corresponding to 4 application programs.

Because the size of the preview interface corresponding to the application program is smaller than the size of the task management interface, the task management interface may generally directly display the preview interfaces corresponding to a plurality of application programs. Moreover, when a large number of application programs are running, the task management interface only displays the preview interfaces corresponding to partial application programs, and the user may trigger the task management interface by a sliding operation to display the preview interfaces corresponding to the remaining application programs.

In some embodiments, the task management interface may include a preferred preview interface arranged at the frontmost of the task management interface. Exemplarily, the preferred preview interface is positioned at the upper left corner of the task management interface In a first example, the preferred preview interface is a preview interface corresponding to the application program running in the foreground. In a second example, the preferred preview interface is a preview interface corresponding to a music application program. In a third example, the preferred preview interface displays system function options. As there are usually many system function options, the preferred preview interface only displays part of the system function options. Therefore, an extension operation control, which may be a triangle, may be set in the preferred preview interface, and all the system function options are displayed in the terminal after the user triggers the extension operation control.

Figure 1C:
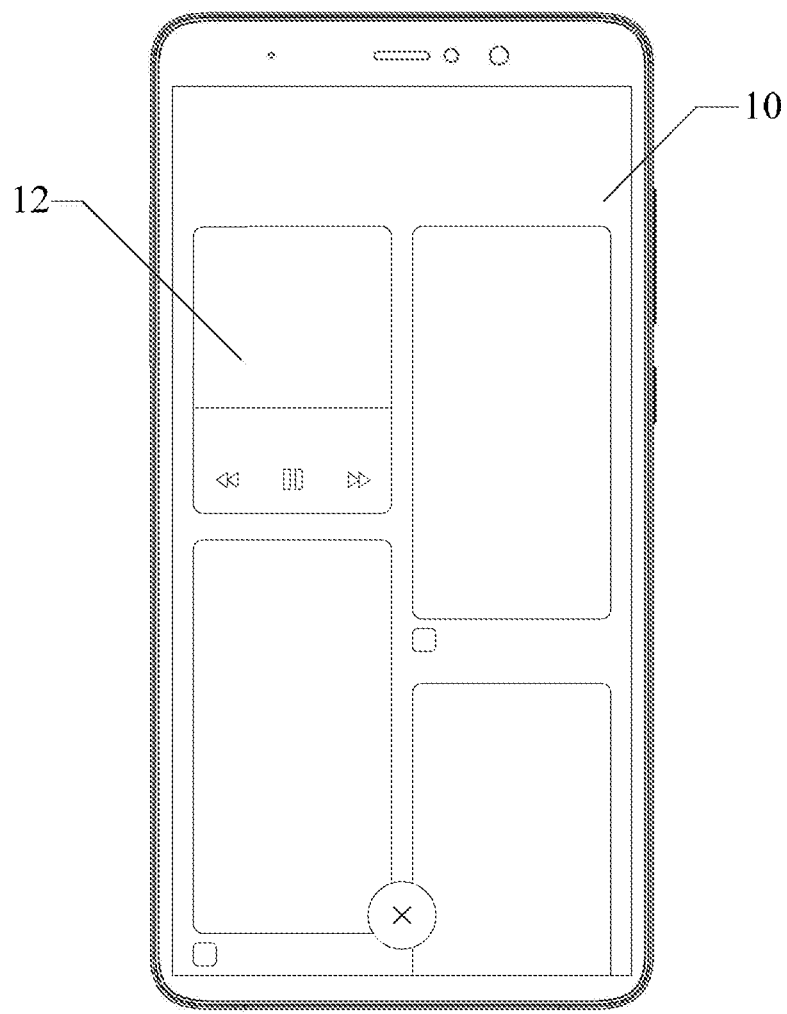
FIG. 1C is a schematic diagram illustrating a preferred preview interface according to some embodiments of the present disclosure.
Figure 1D:
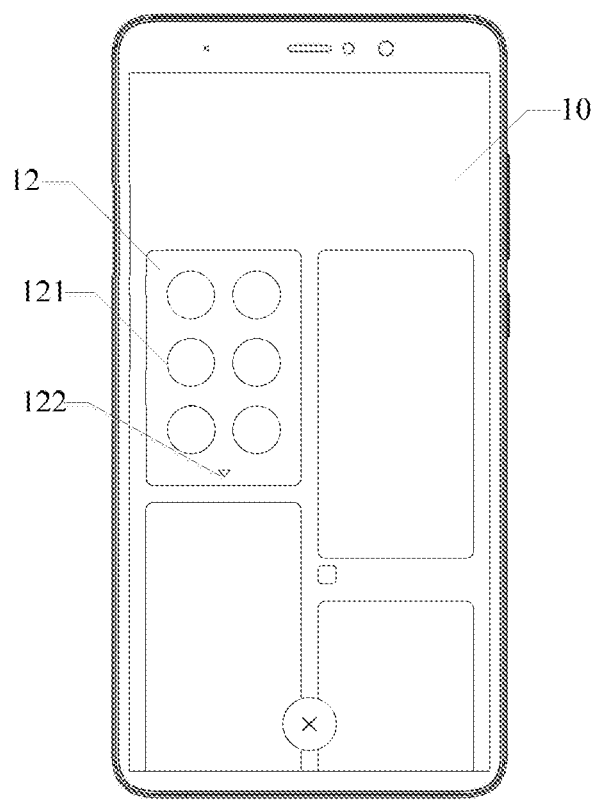
FIG. 1D is a schematic diagram illustrating a preferred preview interface according to some embodiments of the present disclosure.

In combination with FIG. 1C, it shows an interface diagram of a preferred preview interface 12 in some embodiments. The preferred preview interface 12 is a preview interface corresponding to the music application program. In combination with FIG. 1D, it shows an interface diagram of a preferred preview interface 12 in some embodiments. The preferred preview interface 12 includes a system function option 121 and an extension operation control 122.

In some embodiments, prior to step 104, the mobile terminal may predetermine the display position of the preview interface corresponding to the application program in the task management interface. The following embodiments illustrate three possible implementations for determining the display position.

In a first possible implementation, the mobile terminal, according to the last running moments in the foreground respectively corresponding to the n application programs, determines the display positions of the preview interfaces respectively corresponding to the n applications in the task management interface.

The last running moment corresponding to the application program in the foreground refers to the time point when the application program runs in the foreground and the time interval between which and the current time point is the smallest. In some embodiments, the less the time interval between the last running moment corresponding to the application program in the foreground and the current time point is, the more forward the display position of the preview interface corresponding to the application program is in the task management interface. The greater the time interval between the last running moment for the application program in the foreground and the current time point is, the more backward the display position of the preview interface corresponding to the application program is in the task management interface. In a specific example, the display position of the preview interface corresponding to the application program which is running in the foreground is at the frontmost of the task management interface before the mobile terminal displays the task management interface.

In a second possible implementation, the mobile terminal, according to the frequency of usage respectively corresponding to the n application programs determines the display positions of the preview interfaces respectively corresponding to the n application programs in the task management interface.

The frequency of usage corresponding to the application program refers to the frequency and number of times the user uses the application program. In some embodiments, the higher the frequency of usage corresponding to the application program, the more forward the display position of the preview interface corresponding to the application program is in the task management interface. The lower the frequency of usage corresponding to the application program, the more backward the display position of the preview interface corresponding to the application program is in the task management interface.

In a third possible implementation, the mobile terminal, according to the correlation among n application programs, determines the display positions of the preview interfaces respectively corresponding to the n application programs in the task management interface.

The correlation between two application programs may be measured by the number of times of the simultaneous running of the above two application programs. The more the number of times of simultaneous running of the two application programs, the higher correlation between the above two application programs. The less the number of times of simultaneous running of the two application programs, the lower the correlation between the two application programs. In some embodiments, the higher the correlation between the two application programs, the closer the distance between the preview interfaces corresponding to the above respective two application programs displayed in the task management interface. The lower correlation between the two application programs, the further the distance between the display positions of the preview interfaces respectively corresponding to the above two application programs in the task management interface. In a specific example, the mobile terminal displays the preview interface corresponding to the application program running in the foreground at the most front of the task management interface before the mobile terminal displays the task management interface, then determines, according to the correlation between other application programs and the application program corresponding to the preview interface displayed at the frontmost, the display positions of the preview interfaces corresponding to other application programs in the task management interface t.

Therefore, in the method in the embodiments of the present disclosure, the preview interfaces corresponding to a plurality of running application programs are arranged in a lattice in the task management interface, such that the respective preview interfaces do not overlap with each other, and the user may simultaneously view the preview interfaces corresponding to a plurality of application programs. In addition, no other operations are required when the user manages the application program corresponding to preview interfaces displayed in the task management interface, thereby improving the operation efficiency and convenience.

After the mobile terminal displays the preview interface of the running application program in the task management interface, the user may manage the above running application program in the task management interface. For example, the user can trigger the application program to run in the foreground, trigger the application program to stop running and so forth. Based on the alternative embodiment of the embodiments shown in FIG. 1A, the method for displaying the task management interface may further include the following steps.

In step S201, a signal of a drag operation a start position of which is positioned in the preview interface corresponding to a first application program in the task management interface and an end position of which is positioned in the preview interface corresponding to a second application program in the task management interface is received.

In step S202, the first application program and the second application program are switched to run in the foreground triggered by the signal of the drag operation, and the display interfaces of the first and second application programs are displayed in a split-screen.

When the user wish to run two application programs in the foreground simultaneously, and would like that the above application programs running in the foreground simultaneously can be displayed in a split-screen in the current display interface of the mobile terminal, the user may drag the preview interface of one application program to the preview interface of the other application program in the task management interface, and then the mobile terminal exits the task management interface triggered by the signal of the drag operation of the user and the display interfaces of the above two application programs are respectively displayed in a split-screen in the current display interface.

Figure 2:
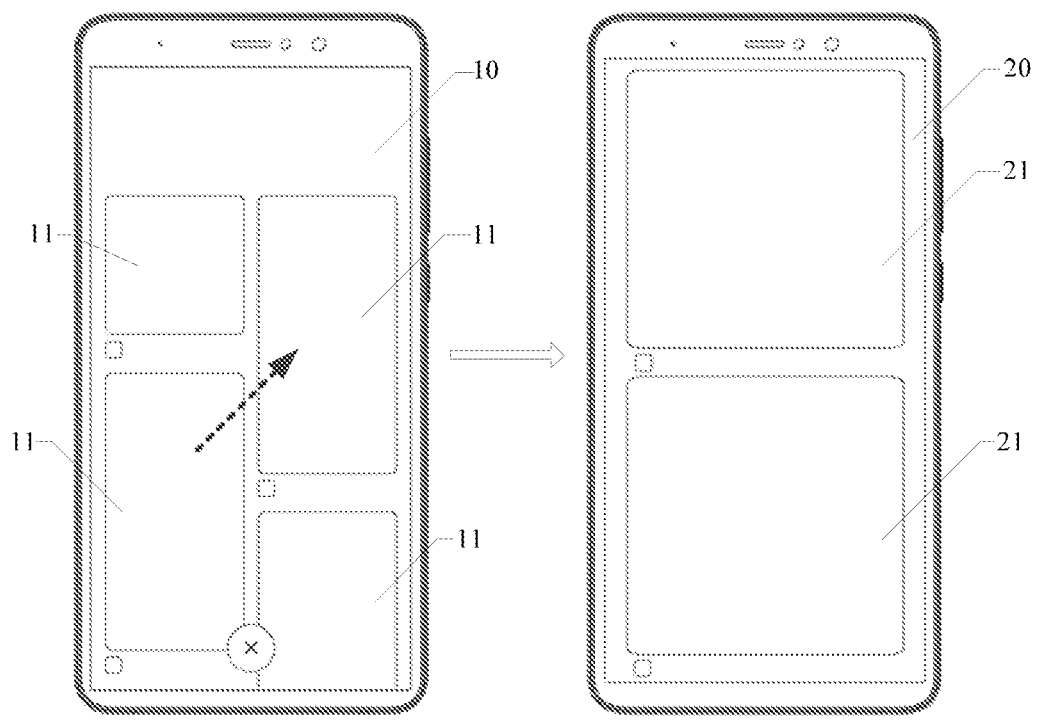
FIG. 2 is a schematic diagram illustrating a split-screen interface according to some embodiments of the present disclosure.

In combination with FIG. 2, it shows a schematic diagram of an interface of a split-screen of some embodiments of the present disclosure. The task management interface 10 includes the preview interfaces 11 corresponding to a plurality of running application programs. When user drags the preview interface 11 corresponding to an application program to the preview interface 11 corresponding to another application program, the terminal exits the task management interface 10, and displays a user interface 21 of the above two application programs in the current display interface 20.

In some embodiments, the method in the embodiments of the present disclosure may further include the following steps.

When receiving a first operation signal for a preview interface corresponding to any application program in the task management interface, the mobile terminal switches the application program to run in the foreground triggered by the first operation signal. The first operation signal may be any of a click operation signal, a long press operation signal, and a sliding operation signal.

When receiving a second operation signal for the preview interface corresponding to any application program in the task management interface, the mobile terminal stops running the application program according to the second operation signal. The second operation signal may be any of a click operation signal, a long press operation signal, and a sliding operation signal.

When receiving a third operation signal for the preview interface corresponding to any application program in the task management interface, the mobile terminal displays a menu option box at the upper layer of the preview interface corresponding to the application program triggered by the third operation signal. The menu option box includes respective menu options corresponding to the application program. For instance, the menu option may include the third operation signal which may be any of a click operation signal, a long press operation signal, and a sliding operation signal.

It should be noted that the first operation signal and the second operation signal differ from the third operation signal.

Therefore, according to the method in the embodiments of the present disclosure, the mobile terminal may display in a split-screen by the drag operation signal triggered by the user. Moreover, the function for managing respective running application programs is also provided.

The user may conduct a unified management on the application programs corresponding to all the preview interfaces displayed in the task management interface. For example, the user may trigger all the running application programs to stop running. Based on the alternative embodiment of the embodiment shown in FIG. 1A, the upper layer of the task management interface also displays a delete operation control, and the method for displaying the task management interface may further include the following steps.

In step S301, a second trigger signal corresponding to a delete operation control is received.

In step S302, n application programs triggered by the second trigger signal are stopped running triggered by the second trigger signal.

Figure 3A:
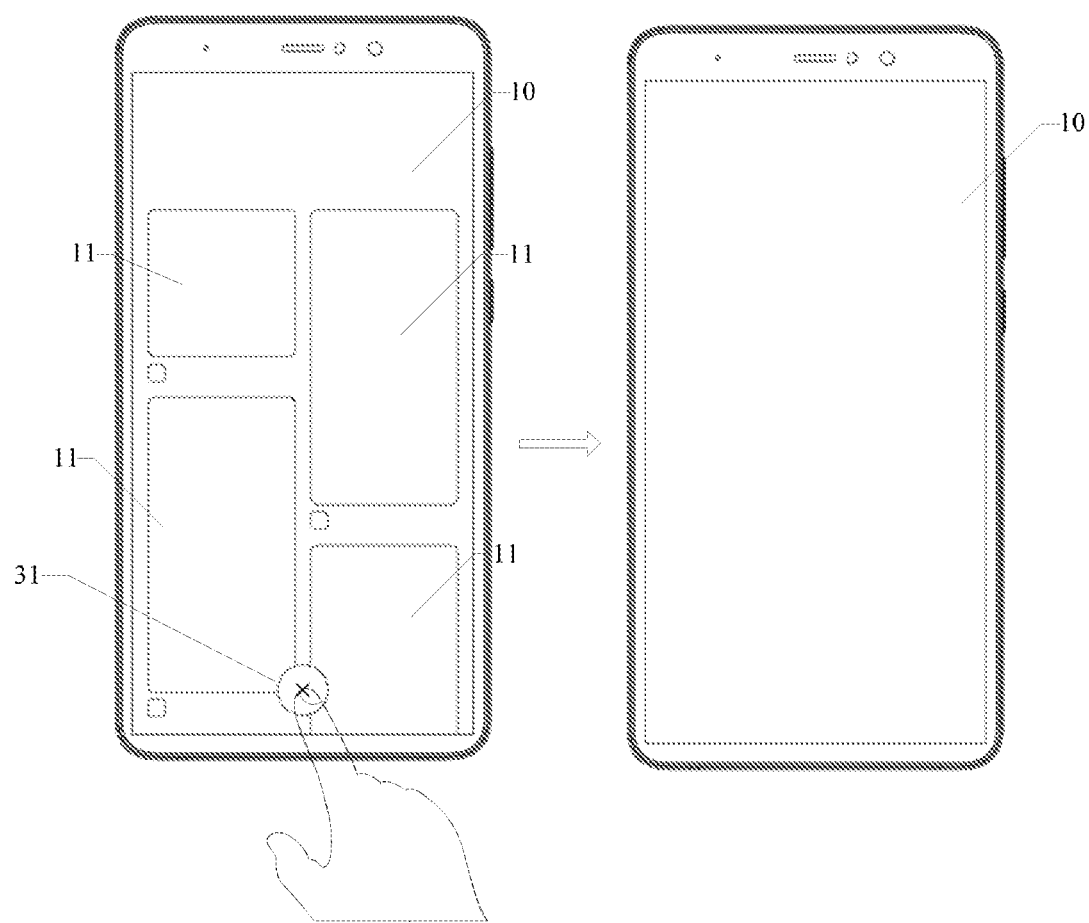
FIG. 3A is a schematic diagram illustrating an interface when a delete operation control is triggered according to some embodiments of the present disclosure.

The delete operation control is used to stop running all the running application programs such that the user can conduct a unified management on all the running application programs. In combination with FIG. 3A, it shows a schematic diagram of an interface when the delete operation control is triggered of some embodiments of the present disclosure. The task management interface 10 includes the preview interfaces 11 corresponding to a plurality of application programs. An upper of the task management interface 10 displays a delete operation control 31. After the user clicks the delete operation control 31, all the running application programs in the terminal stop running. Here, the preview interfaces corresponding to all the application programs are deleted from the task management interface 10.

In addition, since the user only needs to trigger the delete operation control once to stop running all the running application program, compared with the related art where the preview interface displayed in the task management interface needs to be triggered so as to stop running the corresponding application program, the embodiments of the present disclosure can improve the operation efficiency of the user efficiently.

The user may also rapidly open the application program that is not running in the mobile terminal without exiting the task management interface. Based on the alternative embodiment of the embodiment shown in FIG. 1A, the method for displaying the task management interface may further include the following steps.

In step 303, an application program list is displayed when a signal of a first sliding operation in a preset area in the task management interface is received.

The preset area may be a blank area in the task management interface, namely, an area where no preview interface is displayed in the task management interface. The preset area may be at the periphery of the task management interface, such as the upper layer, the lower layer, the left side, the right side and so on, which is not limited in the embodiments of the present disclosure.

The application program list includes application programs installed in the mobile terminal. The application program list may include identifications of the application program installed in the mobile terminal. The identification of the application program is used to uniquely identify the application program. The identification of the application program may be an icon, or a name, etc., which is not limited in the embodiments of the present disclosure. In addition, due to the limited size of the display interface of the mobile terminal, the mobile terminal only displays the identifications of part of the application programs, and the user may, by means of a sliding operation, enable the mobile terminal to display identifications of other application programs in addition to the above part of application programs.

Further, after the application program list is displayed, if the user performs a sliding operation with a direction opposite to the direction of the first sliding operation, on the application program list, the mobile terminal redisplays the task management interface.

By way of the above manner, the user can rapidly open other application programs that are not running in the mobile terminal without exiting the task management interface.

In step 304, a system function interface is displayed when a signal of a second sliding operation in a preset area in the task management interface is received.

Figure 3B:
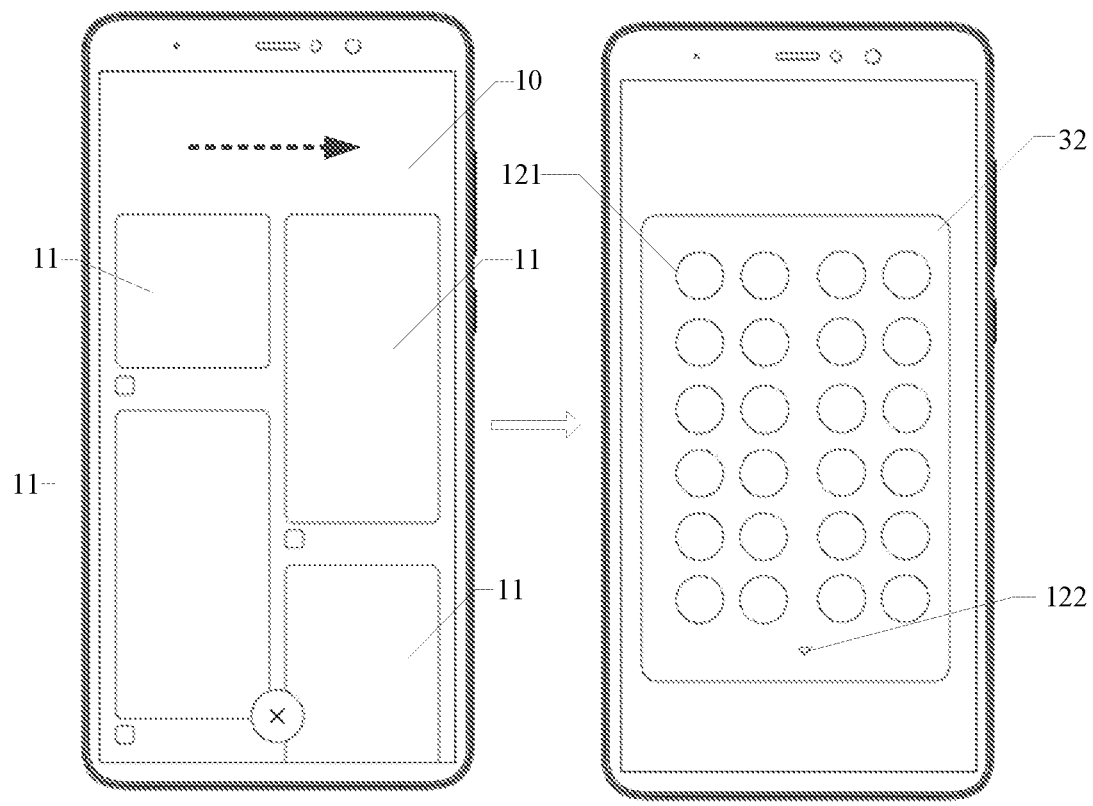
FIG. 3B is a schematic diagram illustrating a system function display interface according to some embodiments of the present disclosure.

The system function interface includes a system function option. Further, after the system function interface is displayed, if the user performs a sliding operation with a direction opposite to the direction of the second sliding operation, on the system function interface, the mobile terminal redisplays the task management interface. In combination with FIG. 3B, it shows a schematic diagram of an interface where a system function interface 32 is displayed according to some embodiments of the present disclosure. The task management interface 10 includes the preview interfaces 11 corresponding to a plurality of application programs. When the area where no preview interface is displayed in the task management interface acquires a left-to-right sliding operation by the user, the terminal displays the system function interface 32 which includes a system function option 121 and an extension operation control 122.

It should be noted that the first sliding operation and the second sliding operation have different sliding directions. Further, the sliding directions of the two sliding operations may be determined according to the actual position of the preset area in the task management interface.

For example, where the preset area is at an upper layer or lower layer of the task management interface, the first sliding operation has a left-to-right sliding direction, and the second sliding operation has a right-to-left sliding direction, or vice versa. For another example, when the preset area is at the left side or the right side of the task management interface, the first sliding operation has a top-to-bottom sliding direction, and the second sliding operation has a bottom-to-top sliding direction, or vice versa. By way of the above manner, the area where the user may perform the sliding operation in the task management interface may be broadened, to facilitate the user's operation.

As such, according to the method of the embodiments of the present disclosure, by providing the delete operation control, the function of stopping running all the running application programs simultaneously is extended for the mobile terminal. Further, the user only needs to trigger the above delete operation control once to stop running all running application programs. Thus, with the situation where the user needs to trigger the preview interface of each running application program to stop the above application program is avoided, and operation efficiency is improved.

Additionally, the application program list or the system function interface can be displayed by acquiring the user's sliding operation on the preset area in the task management interface. In one aspect, the user can rapidly open the other application programs that are not running in the mobile terminal without exiting the task management interface. In another aspect, the user can manage the system function option conveniently without exiting the task management interface.

Various embodiments of the devices of the present disclosure can be employed to perform the methods described above. Details which are not disclosed in the embodiments of the device of the present disclosure may be made reference to the embodiments of the method of the present disclosure.

Figure 4A:
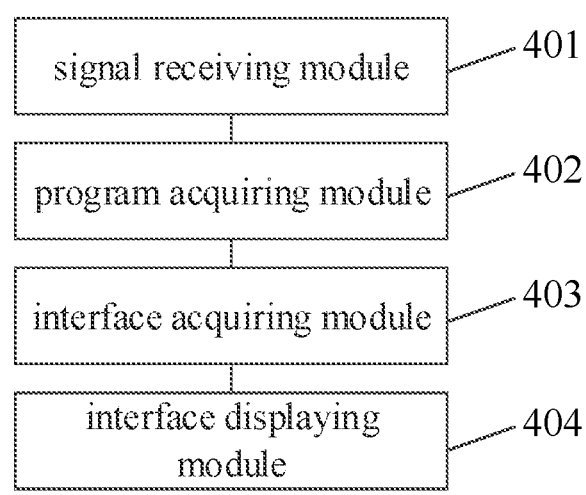
FIG. 4A is a block diagram of a device for displaying a task management interface according to some embodiments of the present disclosure.

FIG. 4A is a block diagram of a device for displaying a task management interface according to some embodiments of the present disclosure. The device has the function of implementing the above method embodiments, and the function may be implemented by hardware, or by corresponding software executed by the hardware. The device may include: a signal receiving module or portion 401, a program acquiring module or portion 402, an interface acquiring module 403, and an interface displaying module or portion 404.

The various device components, blocks, or portions may have modular configurations, or are composed of discrete components, but nonetheless may be referred to as "modules" in general. In other words, the "modules" referred to herein may or may not be in modular forms.

The signal receiving module 401 is configured to receive a first trigger signal for triggering the display of the task management interface.

The program acquiring module 402 is configured to acquire n application programs running in the mobile terminal triggered by the first trigger signal, where n is an integer greater than 1.

The interface acquiring module 403 is configured to acquire a preview interface corresponding to each application program.

The interface displaying module 404 is configured to display the task management interface, the task management interface including preview interfaces respectively corresponding to the n application programs which are arranged in a lattice.

Therefore, according to some embodiments of the present disclosure, the preview interfaces corresponding to a plurality of running application programs are arranged in a lattice in the task management interface, and the respective preview interfaces do not overlap with each other. As such, the user may simultaneously view the preview interfaces corresponding to a plurality of application programs. In addition, no other operations are required when the user manages the application programs corresponding to the preview interfaces displayed in the task management interface, thereby improving the operation efficiency and convenience.

In some embodiments alternative to those illustrated in FIG. 4A, the interface acquiring module 403 is configured to scale down a current display interface of the application program from a first size to a second size, to generate the preview interface corresponding to the application program.

In some other alternative embodiments, the interface acquiring module 403 is configured to clip a display area of a third size from the current display interface of the application program; and scale down the display area of the third size to a fourth size, to generate the preview interface corresponding to the application program. Alternatively, the interface acquiring module 403 is configured to scale down the current display interface of the application program from the first size to the second size; and clip a display area of a fourth size from the scaled-down current display interface of the application program, to generate the preview interface corresponding to the application program.

Figure 4B:
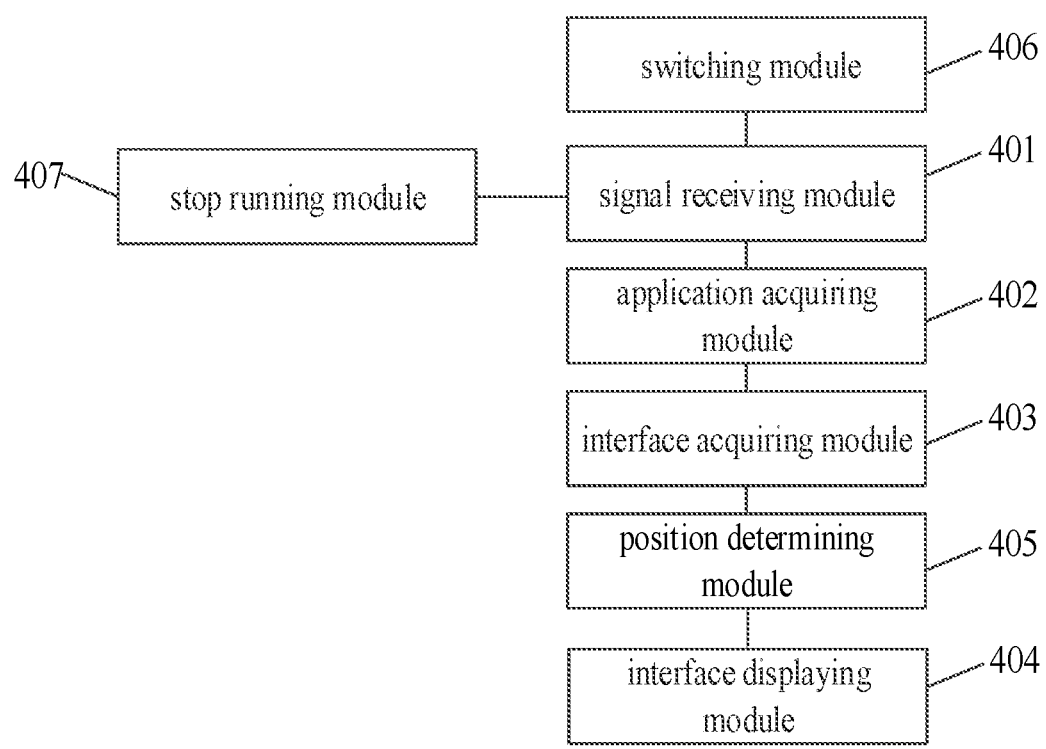
FIG. 4B is a block diagram of a device for displaying a task management interface according to another exemplary embodiment of the present disclosure.

In some other alternative embodiments, referring to FIG. 4B, the device further includes: a position determining module 405. The position determining module 405 is configured to: determine display positions of the preview interfaces respectively corresponding to the n application programs in the task management interface according to last running moments respectively corresponding to the n application programs in the foreground; or, determine display positions of the preview interfaces respectively corresponding to the n application programs in the task management interface according to frequency of usage respectively corresponding to the n application program; or, determine display positions of the preview interfaces respectively corresponding to the n application programs in the task management interface according to the correlation among the n application programs.

In some other alternative embodiments, the task management interface further includes a preferred preview interface arranged at the frontmost of the task management interface. The preferred preview interface is a preview interface corresponding to the application program running in the foreground; or, the preferred preview interface is a preview interface corresponding to a music application program; or, the preferred preview interface displays system function options.

In some other alternative embodiments, referring to FIG. 4B, the device further includes: a switching module 406.

The signal receiving module 401 is configured to receive a signal of a drag operation a start position of which is positioned in a preview interface corresponding to a first application program in the task management interface and an end position of which is positioned in a preview interface corresponding to a second application program in the task management interface.

The switching module 406 is configured to switch the first application program and the second application program to run in the foreground triggered by the signal of the drag operation, display interfaces of the first and second application programs are displayed in a split-screen.

In some other alternative embodiments, a delete operation control is further displayed at an upper layer of the task management interface. Referring to FIG. 4B, the device further includes: a stop running module 407.

The signal receiving module 401 is configured to receive a second trigger signal corresponding to the delete operation control 1.

The stop running module 407 is configured to stop running the n application programs triggered by the second trigger signal.

In some other alternative embodiments, referring to FIG. 4B, the interface displaying module 404 is configured to display an application program list when a signal of a first sliding operation in a preset area in the task management interface is received, the application program list including application programs installed in the mobile terminal; and/or, the interface displaying module is configured to display a system function interface when a signal of a second sliding operation in a preset area in the task management interface is received, the system function interface including a system function option.

It should be noted that the device provided in the above embodiment is exemplified only by the above division of each of the functional modules when the device realize it functions. In practice, the above-described functions may be assigned and completed by different functional modules in accordance with requirements, such that the internal structure of the device can be divided into different functional modules to complete all or part of the functions described above.

With respect to the device in the above embodiment, the specific method of operation performed by each module has been described in details in the embodiments of the method, and the description thereof may not be described in detail here.

There is further provided a device for displaying a task management interface according to some embodiments of the present disclosure. The device may be applied in a mobile terminal for performing the method in the embodiments of the present disclosure. The device includes: a processor, and a memory for storing instructions executable by the processor. Here, the processor is configured to: receive a first trigger signal for triggering display of the task management interface; acquire n application programs running in the mobile terminal triggered by the first trigger signal, where n is an integer greater than 1; acquire a preview interface corresponding to each application program; and display the task management interface, the task management interface including preview interfaces respectively corresponding to the n application programs which are arranged in a lattice.

In some embodiments, the processor is configured to: scale down a current display interface of the application program from a first size to a second size, to generate the preview interface corresponding to the application program.

In some embodiments, the processor is configured to: clip a display area of a third size from the current display interface of the application program; and scale down the display area of the third size to a fourth size, to generate the preview interface corresponding to the application program; or, scale down the current display interface of the application program from the first size to the second size; and clip a display area of a fourth size from the scaled-down current display interface of the application program, to generate the preview interface corresponding to the application program.

In some embodiments, the processor is further configured to: determine display positions of the preview interfaces respectively corresponding to the n application programs in the task management interface according to last running moments respectively corresponding to the n application programs in the foreground; or, determine display positions of the preview interfaces respectively corresponding to the n application programs in the task management interface according to frequency of usage respectively corresponding to the n application programs; or, determine display positions of the preview interfaces respectively corresponding to the n application programs in the task management interface according to the correlation among the n application programs.

In some embodiments, the task management interface further includes a preferred preview interface arranged at the frontmost of the task management interface, wherein the preferred preview interface is a preview interface corresponding to the application program running in the foreground; or, the preferred preview interface is a preview interface corresponding to a music application; or, the preferred preview interface displays system function options.

In some embodiments, the processor is further configured to: a signal of a drag operation a start position of which is positioned in a preview interface corresponding to a first application program in the task management interface and an end position of which is positioned in a preview interface corresponding to a second application program in the task management interface; and switch the first application program and the second application program to run in the foreground triggered by the signal of the drag operation, display interfaces of the first and second application programs are displayed in a split-screen.

In some embodiments, a delete operation control is further displayed at an upper layer of the task management interface. The processor is further configured to: receive a second trigger signal corresponding to the delete operation control; stop running the n application programs triggered by the second trigger signal.

In some embodiments, the processor is further configured to: display an application program list when a signal of a first sliding operation in a preset area in the task management interface is received, the application program list including application programs installed in the mobile terminal; and/or, display a system function interface when a signal of a second sliding operation in a preset area in the task management interface is received, the system function interface including a system function option.

Figure 5:
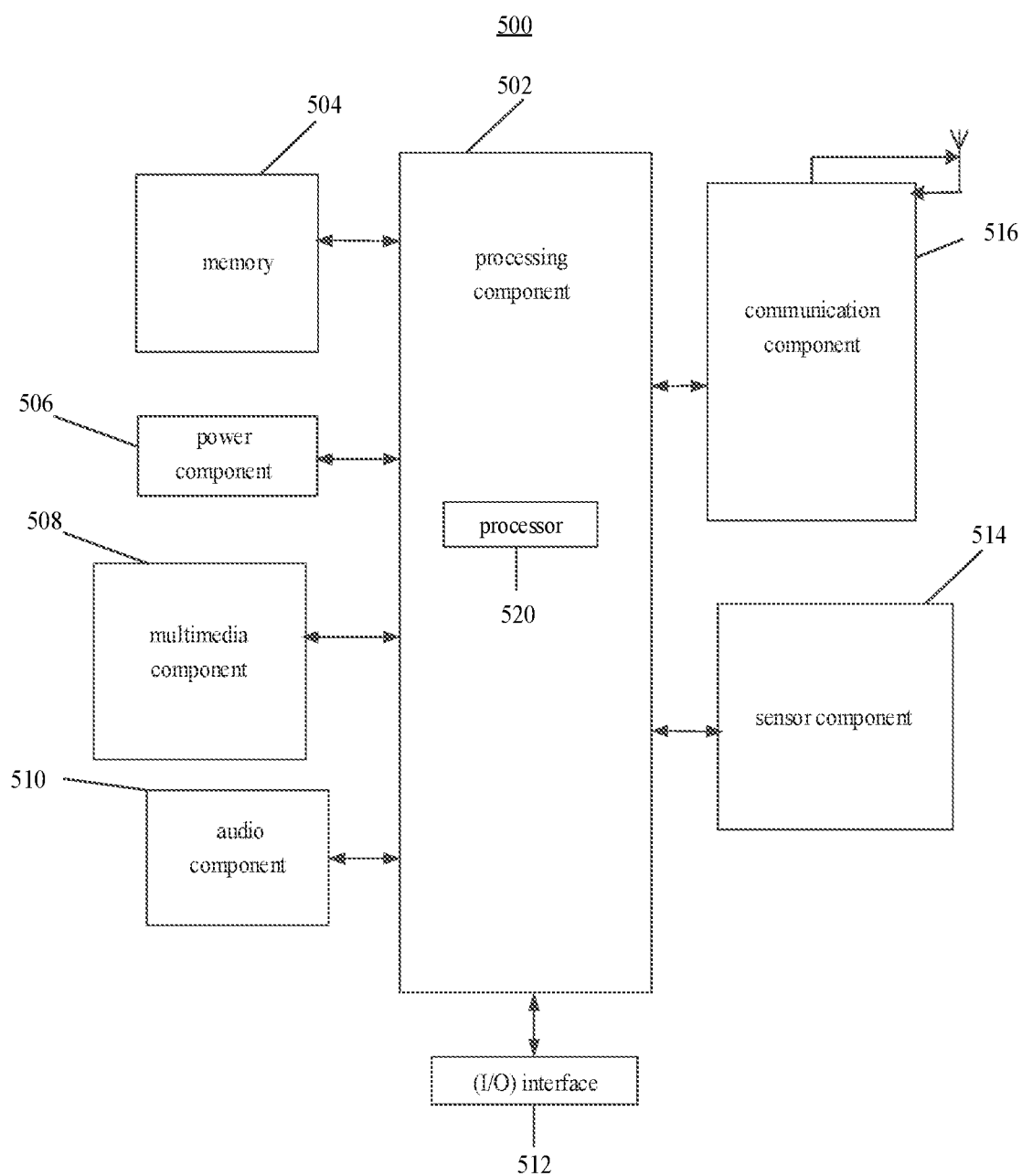
FIG. 5 is a block diagram of a mobile terminal according to some embodiments of the present disclosure.

FIG. 5 is a block diagram of a mobile terminal 500 according to another exemplary embodiment of the present disclosure. For example, the mobile terminal 500 may be a mobile phone, a computer, a digital broadcast terminal, a messaging device, a gaming console, a tablet, a medical device, exercise equipment, a personal digital assistant, and the like.

Referring to FIG. 5, the mobile terminal 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the mobile terminal 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 804 is configured to store various types of data to support the operation of the mobile terminal 500. Examples of such data include instructions for any applications or methods operated on the mobile terminal 500, contact data, phonebook data, messages, pictures, video, etc. The memory 504 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the mobile terminal 500. The power component 506 may include a power management system, one or more power sources, and any other components associated with the generation, management, and distribution of power in the mobile terminal 500.

The multimedia component 508 includes a screen providing an output interface between the mobile terminal 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the mobile terminal 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the mobile terminal 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the mobile terminal 500. For instance, the sensor component 514 may detect an open/closed status of the mobile terminal 500, relative positioning of components, e.g., the display and the keypad, of the mobile terminal 500, a change in position of the mobile terminal 500 or a component of the mobile terminal 500, a presence or absence of user contact with the mobile terminal 500, an orientation or an acceleration/deceleration of the mobile terminal 500, and a change in temperature of the mobile terminal 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the mobile terminal 500 and other devices. The mobile terminal 500 may access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications.

In some embodiments, the mobile terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for displaying a task management interface.

In some embodiments, there is also provided a non-transitory computer-readable storage medium including instructions, such as the memory 504 including instructions. The instructions may be executed by the processor 520 in the mobile terminal 500, for performing the above-described methods displaying a task management interface. For example, the non-transitory computer-readable storage medium may be a ROM, a RAM, a CD-ROM, a magnetic tape, a floppy disc, an optical data storage device, and the like.

Instructions stored in the storage medium, when executed by the processor of the mobile terminal 500, cause the mobile terminal 500 to perform any one of the methods for displaying a task management interface.

At least some of the embodiments of the present disclosure can have one or more of the following advantages. By arranging the preview interfaces corresponding to a plurality of running application programs in a lattice in the task management interface, respective preview interfaces do not overlap with each other. As such, the user may view the preview interfaces respectively corresponding to the plurality of application programs simultaneously. In addition, no other operations are required when the user manages the application programs corresponding to preview interfaces displayed in the task management interface, thereby improving the operation efficiency and convenience.

It should be understood that the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for displaying a task management interface, wherein the method is applied in a mobile terminal, and comprises:
receiving a first trigger signal for triggering display of the task management interface;
acquiring n application programs running in the mobile terminal triggered by the first trigger signal, where n is an integer greater than 1;
acquiring a preview interface corresponding to each application program; and
displaying the task management interface, the task management interface including preview interfaces respectively corresponding to the n application programs which are arranged in a lattice,
wherein the method further comprises:
determining display positions of the preview interfaces respectively corresponding to the n application programs in the task management interface according to a correlation among the n application programs; and
wherein two application programs with a higher correlation have a closer distance between the preview interfaces corresponding to the two application programs displayed in the task management interface.

2. The method according to claim 1, wherein the acquiring the preview interface corresponding to the application program comprises:
scaling down a current display interface of the application program from a first size to a second size to generate the preview interface corresponding to the application program.

3. The method according to claim 1, wherein the acquiring the preview interface corresponding to the application program comprises:
dipping a display area of a third size from the current display interface of the application program; and scaling down the display area of the third size to a fourth size, to generate the preview interface corresponding to the application program.

4. The method according to claim 1, wherein the acquiring the preview interface corresponding to the application program comprises:
scaling down the current display interface of the application program from the first size to the second size; and dipping a display area of a fourth size from the scaled-down current display interface of the application program, to generate the preview interface corresponding to the application program.

5. The method according to claim 1, wherein the method further comprises:
determining display positions of the preview interfaces respectively corresponding to the n application programs in the task management interface according to last running moments respectively corresponding to the n application programs in the foreground.

6. The method according to claim 1, wherein the method further comprises:
determining display positions of the preview interfaces respectively corresponding to the n application programs in the task management interface according to frequency of usage respectively corresponding to the n application programs.

7. The method according to claim 1, wherein the task management interface further includes a preferred preview interface arranged at the frontmost of the task management interface;

wherein the preferred preview interface is a preview interface corresponding to the application program running in the foreground; or, the preferred preview interface is a preview interface corresponding to a music application program; or, the preferred preview interface displays system function options.

8. The method according to claim 1, wherein the method further comprises:
receiving a signal of a drag operation a start position of which is positioned in a preview interface corresponding to a first application program in the task management interface and an end position of which is positioned in a preview interface corresponding to a second application program in the task management interface; and
switching the first application program and the second application program to run in the foreground triggered by the signal of the drag operation, display interfaces of the first and second application programs are displayed in a split-screen.

9. The method according to claim 1, wherein a delete operation control is further displayed at an upper layer of the task management interface; the method further comprising:
receiving a second trigger signal corresponding to the delete operation control; and
stopping running the n application programs triggered by the second trigger signal.

10. The method according to claim 1, wherein the method further comprises at least one of:
displaying an application program list when a signal of a first sliding operation in a preset area in the task management interface is received, the application program list including application programs installed in the mobile terminal; and
displaying a system function interface when a signal of a second sliding operation in a preset area in the task management interface is received, the system function interface including a system function option.

11. A device for displaying a task management interface, wherein the device is applied in a mobile terminal, and comprises:
a processor; and
a memory for storing instructions executable by the processor;
wherein the processor is configured to:
receive a first trigger signal for triggering display of the task management interface;
acquire n application programs running in the mobile terminal triggered by the first trigger signal, where n is an integer greater than 1;
acquire a preview interface corresponding to each application program; and
display the task management interface, the task management interface including preview interfaces respectively corresponding to the n application programs which are arranged in a lattice,
wherein the processor is further configured to perform:
determining display positions of the preview interfaces respectively corresponding to the n application programs in the task management interface according to a correlation among the n application programs; and
wherein two application programs with a higher correlation have a closer distance between the preview interfaces corresponding to the two application programs displayed in the task management interface.

12. The device according to claim 11, wherein the processor is configured to perform operation of:

scaling down a current display interface of the application program from a first size to a second size to generate the preview interface corresponding to the application program.

13. The device according to claim 11, wherein the processor is further configured to perform one of following operations of:
dipping a display area of a third size from the current display interface of the application program, and scaling down the display area of the third size to a fourth size, to generate the preview interface corresponding to the application program; and
scaling down the current display interface of the application program from the first size to the second size, and clipping a display area of a fourth size from the scaled-down current display interface of the application program, to generate the preview interface corresponding to the application program.

14. The device according to claim 11, wherein the processor is further configured to perform one of following operations of:
determining display positions of the preview interfaces respectively corresponding to the n application programs in the task management interface according to last running moments respectively corresponding to the n application programs in the foreground; and
determining display positions of the preview interfaces respectively corresponding to the n application programs in the task management interface according to frequency of usage respectively corresponding to the n application programs.

15. The device according to claim 11, the task management interface further includes a preferred preview interface arranged at the frontmost of the task management interface;
wherein the preferred preview interface is a preview interface corresponding to the application program running in the foreground; or, the preferred preview interface is a preview interface corresponding to a music application program; or, the preferred preview interface displays system function options.

16. The device according to claim 11, wherein the processor is further configured to perform operations of:
receiving a signal of a drag operation a start position of which is positioned in a preview interface corresponding to a first application program in the task management interface and an end position of which is positioned in a preview interface corresponding to a second application program in the task management interface; and
switching the first application program and the second application program to run in the foreground triggered by the signal of the drag operation, display interfaces of the first and second application programs are displayed in a split-screen.

17. The device according to claim 11, wherein the processor is further configured to perform operations of:
receiving a second trigger signal corresponding to the delete operation control; and
stopping running the n application programs triggered by the second trigger signal.

18. The device according to claim 11, wherein the processor is further configured to perform at least one of following operations of:
displaying an application program list when a signal of a first sliding operation in a preset area in the task management interface is received; the application program list including application programs installed in the mobile terminal; and displaying a system function interface when a signal of a second sliding operation in a preset area in the task management interface is received, the system function interface including a system function option.

19. A non-transitory computer-readable storage medium having stored therein programs for performing a method for displaying a task management interface, wherein the method is applied in a mobile terminal, and comprises:

receiving a first trigger signal for triggering display of the task management interface;

acquiring n application programs running in the mobile terminal triggered by the first trigger signal, where n is an integer greater than 1;

acquiring a preview interface corresponding to each application program; and displaying the task management interface, the task management interface including preview interfaces respectively corresponding to the n application programs which are arranged in a lattice, wherein the method further comprises:

determining display positions of the preview interfaces respectively corresponding to the n application programs in the task management interface according to a correlation among the n application programs; and wherein two application programs with a higher correlation have a closer distance between the preview interfaces corresponding to the two application programs displayed in the task management interface.

* * * * *